US012786861B2

(12) United States Patent
Yang et al.

(10) Patent No.: US 12,786,861 B2
(45) Date of Patent: Nov. 3, 2026

(54) ACCESS PROCEDURE FOR CELL FREE MIMO

(71) Applicant: Nokia Technologies Oy, Espoo (FI)

(72) Inventors: Tao Yang, Shanghai (CN); Pingping Wen, Shanghai (CN); Hao Liu, Shanghai (CN); Nuan Song, Shanghai (CN); Yan Zhao, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 276 days.

(21) Appl. No.: 18/695,257

(22) PCT Filed: Sep. 30, 2021

(86) PCT No.: PCT/CN2021/122337
§ 371 (c)(1),
(2) Date: Mar. 25, 2024

(87) PCT Pub. No.: WO2023/050369
PCT Pub. Date: Apr. 6, 2023

(65) Prior Publication Data
US 2024/0340779 A1 Oct. 10, 2024

(51) Int. Cl.
*H04W 48/16* (2009.01)
*H04W 72/1268* (2023.01)
*H04W 76/10* (2018.01)

(52) U.S. Cl.
CPC ....... *H04W 48/16* (2013.01); *H04W 72/1268* (2013.01); *H04W 76/10* (2018.02)

(58) Field of Classification Search
CPC .. H04W 48/16; H04W 72/1268; H04W 76/10
See application file for complete search history.

(56) References Cited

U.S. PATENT DOCUMENTS 11,412,425 B2 * 8/2022 Da Silva ........... H04W 36/0072
2009/0197603 A1 8/2009 Ji et al.
2012/0182897 A1 * 7/2012 Han ..................... H04W 48/20
370/252
(Continued)

FOREIGN PATENT DOCUMENTS

CN 102256368 A 11/2011
CN 107836130 A 3/2018
(Continued)

OTHER PUBLICATIONS

Office action received for corresponding Chinese Patent Application No. 202211217796.7, dated Jan. 12, 2026, 9 pages of office action and 8 pages of translation available.
(Continued)

*Primary Examiner* — Mohamed Barakat
(74) *Attorney, Agent, or Firm* — Lippes Mathias LLP

(57) ABSTRACT

Example embodiments of the present disclosure relate to methods, devices apparatuses and computer readable storage media of an access procedure for Cell-free Multi-input Multi-output (MIMO). In example embodiments, a terminal device transmits an access request to a first set of uplink access network devices. The access request contains a list of identifications of candidate downlink access network devices. Then, the terminal device receives an access response from a first set of downlink access network devices.

13 Claims, 11 Drawing Sheets

(56) References Cited

U.S. PATENT DOCUMENTS

| | | | | |
|---|---|---|---|---|
| 2012/0287859 | A1 | 11/2012 | Ji et al. | |
| 2014/0024386 | A1* | 1/2014 | Novak | H04W 72/541 455/452.1 |
| 2018/0035369 | A1 | 2/2018 | Hahn et al. | |
| 2018/0049263 | A1* | 2/2018 | Hahn | H04W 72/12 |
| 2018/0279407 | A1* | 9/2018 | Xu | H04W 64/003 |
| 2020/0015114 | A1* | 1/2020 | Li | H04W 72/1268 |
| 2020/0092928 | A1* | 3/2020 | Shi | H04W 76/15 |
| 2020/0329414 | A1* | 10/2020 | Talukdar | H04W 36/08 |

FOREIGN PATENT DOCUMENTS

| | | | |
|---|---|---|---|
| CN | 110999400 | A | 4/2020 |
| CN | 111225410 | A | 6/2020 |
| EP | 4410042 | A1 | 8/2024 |
| WO | 2020/076203 | A1 | 4/2020 |
| WO | 2021/109414 | A1 | 6/2021 |
| WO | 2023/050369 | A1 | 4/2023 |

OTHER PUBLICATIONS

International Search Report and Written Opinion received for corresponding Patent Cooperation Treaty Application No. PCT/CN2021/122337, dated Jun. 23, 2022, 12 pages.

Extended European Search Report received for corresponding European Patent Application No. 21958941.3, dated May 12, 2025, 12 pages.

* cited by examiner

ACCESS PROCEDURE FOR CELL FREE MIMO

FIELD

Example embodiments of the present disclosure generally relate to the field of communications, and in particular, to methods, devices apparatuses and computer readable storage media of an access procedure for Cell-free Multi-input Multi-output (MIMO).

BACKGROUND

Cell-free Multi-input Multi-output (MIMO) is regarded as one of key technologies in the sixth generation (6G), to provide high system capacity, at both of sub-6G and millimeter-wave (mmW) frequency band. In network architecture of 6G cell-free MIMO transmission, there are at least two types of network devices, including access points (APs) and central processing units (CPUs). For cell-free MIMO, there are two key features which includes that a plurality of APs connect to a CPU, and a plurality of APs serve user equipment (UE) in uplink (UL) and downlink (DL) communication for higher system performance.

Due to different network architecture and features in 6G and in the fifth generation (5G) and the fourth generation (4G), some legacy 5G/4G defined procedures cannot be used any more in a 6G stage. Till now, there is not any discussion about an access procedure to support cell-free MIMO transmission in 6G.

SUMMARY

In general, example embodiments of the present disclosure provide methods, devices apparatuses and computer readable storage media of an access procedure for Cell-free Multi-input Multi-output (MIMO).

In a first aspect, a method is provided at a terminal device. In the method, the terminal device transmits an access request to a first set of uplink access network devices. The access request contains a list of identifications of candidate downlink access network devices. Then, the terminal device receives an access response from a first set of downlink access network devices.

In a second aspect, a method is provided at a central network device. In the method, the central network device receives, via a third set of uplink access network devices from a terminal device, an access request containing a list of identifications of candidate downlink access network devices. Then, the central network device transmits an access response via a first set of downlink access network devices towards the terminal device In a third aspect, a method is provided at a first uplink access network device. In the method, the first uplink access network device receives an access request from a terminal device. The access request contains a list of identifications of candidate downlink access network devices. The first uplink access network device forwards the access request to a central network device.

In a fourth aspect, a method is provided at a second uplink access network device. In the method, the second uplink access network device receives a connection setup request from a terminal device. The second uplink access network device forwards the connection setup request to a central network device. The second uplink access network device transmits a received power indication of the connection setup request to the central network device.

In a fifth aspect, a device is provided which comprises at least one processor and at least one memory including computer program code. The at least one memory and the computer program code are configured to, with the at least one processor, cause the device to perform the method according to any of the first to fourth aspects.

In a fifth aspect, there is provided an apparatus comprising means for performing the method according to any of the first to fourth aspects.

In a sixth aspect, there is provided a computer readable storage medium comprising program instructions stored thereon. The instructions, when executed by a processor of a device, cause the device to perform the method according to any of the first to fourth aspects.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
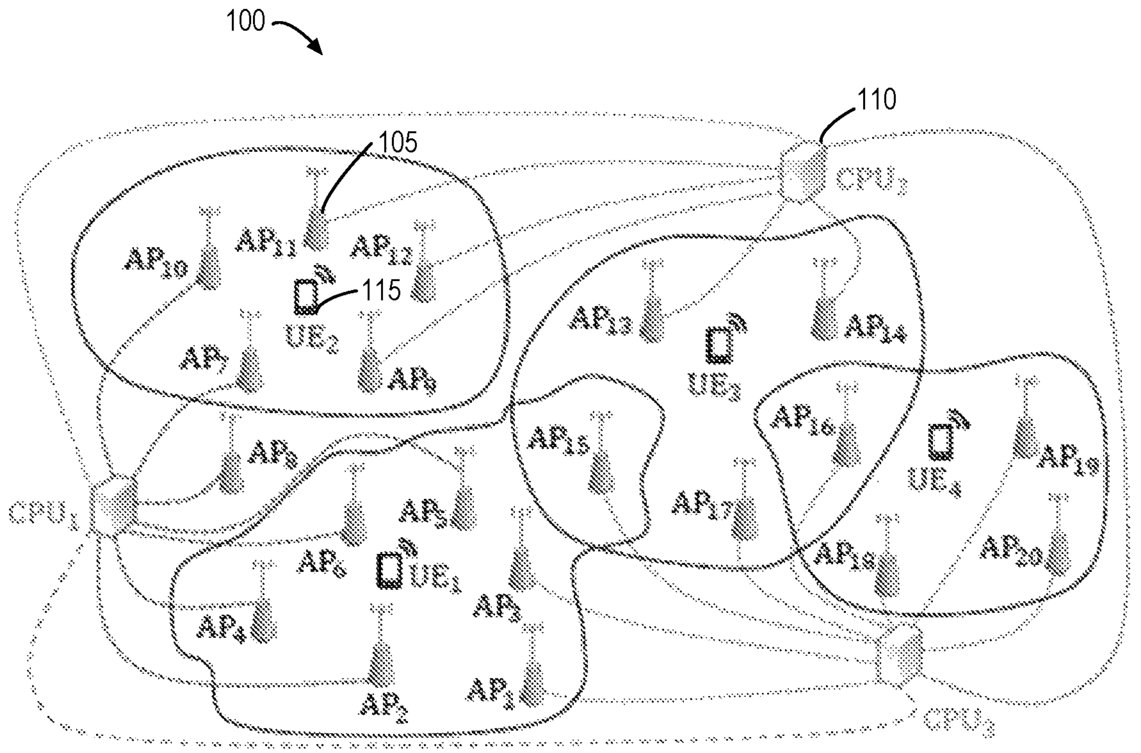
FIG. 1 illustrates general network architecture for 6G cell-free MIMO transmission.

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" or "user equipment" (UE) refers to any terminal device capable of wireless communications with each other or with the base station. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the base station on predetermined schedules, when triggered by an internal or external event, or in response to requests from the network side.

Examples of the UE include, but are not limited to, smart phones, wireless-enabled tablet computers, laptop-embedded equipment (LEE), laptop-mounted equipment (LME), wireless customer-premises equipment (CPE), sensors, metering devices, personal wearables such as watches, and/or vehicles that are capable of communication. For the purpose of discussion, some example embodiments will be described with reference to UEs as examples of the terminal devices, and the terms "terminal device" and "user equipment" (UE) may be used interchangeably in the context of the present disclosure.

As used herein, the term "network device" refers to a device at a network side to provide services to a terminal device in a communication network. As used herein, the term "access network device" refers to a network device via which a terminal device can have an access to the network. As used herein, the term "uplink access network device" refers to a network device to serve a terminal device in UL communication, and the term "downlink access network device" refers to a network device to serve a terminal device in DL communication. As used herein, the term "central network device" refers to a device at a network side to control and schedule the uplink and downlink access network devices to serve a terminal device. For the purpose of discussion, some example embodiments will be described with reference to UL/DL access points (APs) as examples of the uplink and downlink access network devices and a central processing unit (CPU) as an example of the central network device.

As used herein, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular base station, or other computing or base station.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

FIG. 1 shows general network architecture 100 for 6G cell-free MIMO transmission. As shown, a plurality of APs 105 connect to a CPU 110 and serve a UE 115 in uplink (UL) and downlink (DL) to benefit UL and DL transmission of the UE 115 for higher system performance. The functional partitioning between the Aps 105 and the CPUs 110 are still under discussion, especially on Layer 1 (L1) or a Physical Layer. The selection of APs 105 to serve the UE 110 is also still under discussion.

It is clear that the network architecture for 6G cell-free MIMO as shown in FIG. 1 is different from that of legacy 5G and 4G networks. This will lead to a situation that many legacy procedures and signaling flows in 5G and 4G stages cannot be used in a 6G stage to enable cell-free access and transmission.

The inventors notice that the access procedure and mobility handling are currently important issue to enable cell-free MIMO transmission. In a legacy 5G/4G stage, a 4-step access procedure is adopted to achieve UL synchronization (SYN) with a network and establish a connection between a UE and a base station (for example, a gNB). The 4-step access procedure comprises transmission of four messages over an air interface between a UE and a base station. For example, the UE first sends to the base station Message 1 containing a random access request so that the base station can calculate a timing advance (TA) value. The base station sends to the UE Message 2 containing the TA value and other configuration information including scheduling information for Message 3. Then, the UE sends to the base station Message 3 containing connection information. The base station sends to the UE Message 4 to confirm the connection and indicate the related configuration. However, due to the different network architecture and features, this 4-step access procedure adopted in a legacy 5G/4G system cannot be applied in 6G to enable cell-free MIMO transmission.

The 4-step procedure in 5G/4G only involves behaviors of one UE and one gNB. As a result, the UE has only UL SYN to one gNB to guarantee that the following UL/DL communication between the UE and the gNB can be conducted immediately after the access procedure. However, for 6G cell-free MIMO, 3-types of nodes or devices are involved in a communication link, and more than one AP will be selected for UL/DL transmission of the UE. Therefore, the legacy 4-step between one UE and one gNB is inapplicable for the 6G cell-free MIMO scenario. There is a need to design an access procedure in this new network architecture and select appropriate APs to facilitate the UL/DL transmission of the UE.

Example embodiments of the present disclosure provide an access scheme in the network architecture including three types of devices including a terminal device (such as a UE), UL/DL access network devices (such as UL/DL APs) and central network devices (such as CPUs). With this access scheme, a terminal device transmits an access request (such as Message 1) containing a list of identifications of candidate downlink access network devices to a network for final selection and confirmation of serving DL access network devices. The access request is received by one or more UL access network devices (referred to as a first set of UL access network devices). Then, the terminal device receives an access response (such as Message 2) from one or more downlink access network devices (referred to as a first set of DL access network devices).

In this way, a final decision can be made at a network side to select a plurality of DL access network devices with the assistance of the terminal device. Accordingly, these DL access network devices will be started immediately after the access procedure, thereby improving transmission efficiency and reducing system overhead.

Figure 2:
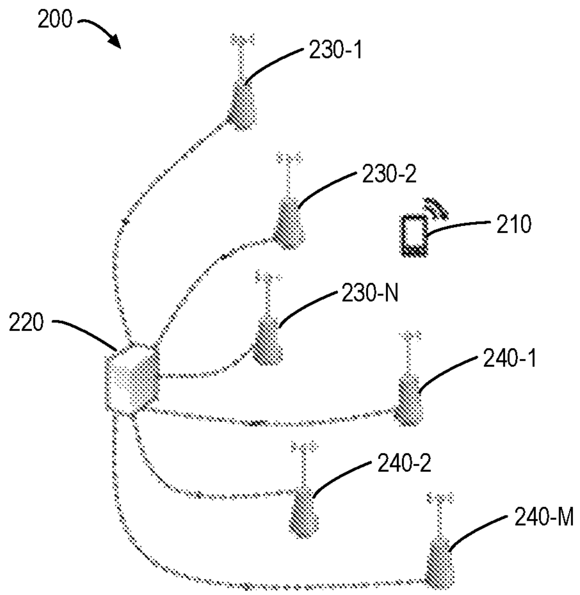
FIG. 2 illustrates an example environment in which example embodiments of the present disclosure can be implemented.

FIG. 2 shows an example environment 200 in which example embodiments of the present disclosure can be implemented.

The environment 200, which may be a part of a communication network, comprises a terminal device 210, a central network device 220 and a plurality of UL access network devices 230-1, 230-2 . . . 230-N and a plurality of DL access network devices 240-1, 240-2 . . . , 240-M where N and M represent a positive integer greater than two. The UL access network devices 230-1 . . . , 230-N and the DL access network devices 240-2 . . . , 240-M can be scheduled by the central network device 220 to serve the terminal device 210 in UL/DL communications. For the purpose of discussion, the UL and DL access network devices will be collectively or individually referred to as UL access network devices 230 and DL access network devices 240, respectively.

It is to be understood that the UL and DL access network devices are show separately only for the purpose of illustration, without suggesting any limitation to the scope of the present disclosure. In some example embodiments, the UL or DL access network device may have a function of both the UL and DL communications and thus be capable of serving the terminal device 210 in both the UL and DL communications.

It is also to be understood that one terminal device, one central network device and a plurality of UL/DL access network devices are shown in the environment 200 only for the purpose of illustration, without suggesting any limitation to the scope of the present disclosure. In some example embodiments, the environment 200 may comprise more terminal devices that can be served by more UL/DL access network devices scheduled by more central network devices.

The communications in the environment 200 may follow any suitable communication standards or protocols, which are already in existence or to be developed in the future, such as Universal Mobile Telecommunications System (UMTS), long term evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (cMBB), massive machine type communication (mMTC), ultra-reliable low latency communication (URLLC), Carrier Aggregation (CA), Dual Connection (DC), and New Radio Unlicensed (NR-U) technologies.

In the environment 200, when the terminal device 210 is to access the network, the terminal device 210 transmits an access request containing a list of identifications of candidate DL access network devices, to a first set of UL access network devices 230 which then forwards the access request to the central network device 220. The first set of UL access network devices may or may not be identified by the terminal device 210 in different example embodiments which will be detailed in the following paragraphs.

From the candidate DL access network devices identified by the terminal device 210, the central network device 220 may determine one or more serving DL access network devices 230 during an access procedure. Further, the serving DL access network devices may be started immediately after the access procedure. Thus, the communication efficiency may be improved, thereby improving system performance.

Then, the terminal device 210 receives an access response from a first set of DL access network devices 240. The first set of DL access network devices 240 may or may not be selected from the candidate DL access network devices identified by the terminal device 210 in the access request, which will be detailed in the following paragraphs.

Figure 3:
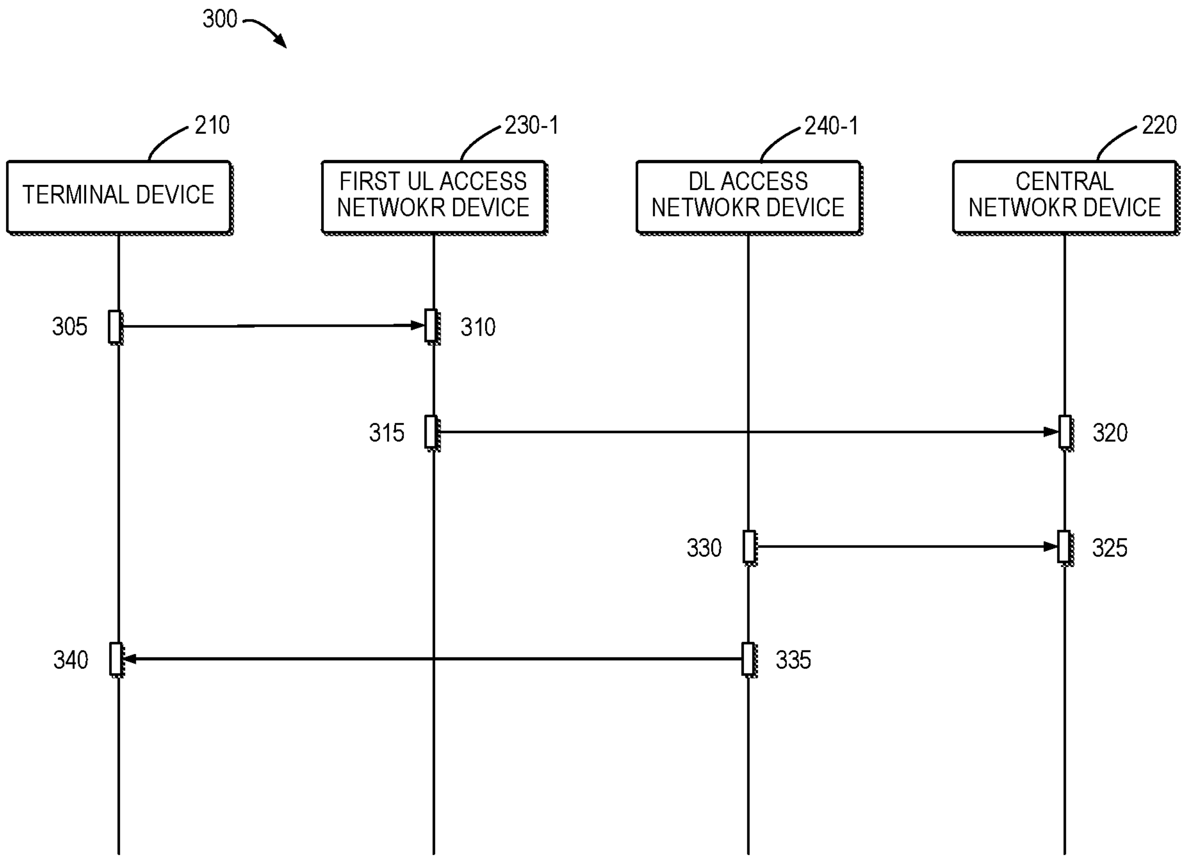
FIG. 3 illustrates a signaling flow between a terminal device, a first UL access network device, the DL access network device and a central network device according to some example embodiments of the present disclosure.

FIG. 3 shows a signaling flow 300 between the terminal device 210, the UL access network device 230-1, the DL access network device 240-1 and the central network device 220 according to some example embodiments of the present disclosure.

As shown in FIG. 3, the terminal device 210 transmits (305) an access request to a first set of UL access network devices 230 including the UL access network device 230-1 (referred to as a first UL device 230-1). The access request contains a list of identifications of candidate DL access network devices. Additionally, the access request may contain an access resource indication such as preamble information, radio resource indication, and/or other access related resource indication that is currently used or to be used in the future in an access procedure. The access request may be carried in Message 1 or any other suitable message that can be used in an access procedure.

The candidate DL access network devices may be determined by the terminal device 210 based on received powers of signals from the candidate downlink access network devices. In some example embodiments, the identifications of candidate DL access network devices may be ordered in the list based on the corresponding received power. For example, the identifications of candidate DL access network devices may be ranked in a descending or ascending order of the received power. The identifications of candidate DL access network devices may also be ordered according to other pre-defined principles. The order of identifications of candidate DL access network devices may be used by the network to differentiate access requests from different terminal devices. The reason is that it is with very low probability that access requests from different terminal devices have the same list of candidate DL access network devices and the same order information.

As discussed above, the terminal device 210 may or may not identify the first set of UL access network devices 230. In some example embodiments, the terminal device 210 may transmit the access request, for example, using a common access resource. For example, the central network device 220 may configure the same access related information to UL access network devices within an access cluster. When the terminal device 210 transmits the access request to the network over an air interface using the access related information, all the UL access network device in the access cluster has a possibility to successfully decode the access request and thus forms the first set of UL access network devices. It is possible that a plurality of UL access network devices may successfully decode the access request simultaneously. As such, spatial diversity may be leveraged to improve the reception success probability of the access request.

In some other example embodiments, the terminal device 210 may transmit the access request using an access resource scheduled or allocated to the specific one or more UL access network devices 230, for example, by the central network device 220 to specify the receivers. For example, the terminal device 210 may transmit the access request using an access resource dedicated to the first UL access network device 230-1. In this example, the first set of UL access network devices may include only the first UL access network device 230-1.

In some example embodiments, in order to improve the transmission success probability of the access request, the terminal device 210 may transmit the access request to the first UL access network device 230-1 and other UL access network devices in the first set of network devices one by one, for example. These UL access network devices may be assigned to the same access resource or different access resources.

In this example as shown in FIG. 3, the first UL access network device 230-1 receives (310) the access request and then forwards (315) the access request to the central network device 220. Just for the purpose of illustration, only the first UL access network device 230-1 is shown in FIG. 3. In the embodiments where the first set of UL access network devices includes a plurality of UL access network devices, one or more other UL access network devices in the first set of UL access network devices may have a chance to receive the access request and forwards the access request to the central network device 220.

Accordingly, the central network device 220 receives (320) the access request containing a list of identifications of candidate DL access network devices. In the example embodiments where the access request contains an access resource indication and/or the identifications of candidate DL access network devices are ordered, the central network device 220 may identify that the access request is transmitted by the terminal device 210. Thus, the central network device 220 may differentiate access requests transmitted by different terminal devices.

Based on the candidate DL access network devices identified by the terminal device 210, the central network device 220 may determine one or more serving DL network devices to serve the terminal device 210, to improve the communication efficiency. To determine the DL access network devices, the central network device 220 may additionally consider other information such as loads and the number of served terminal devices of the individual DL access network devices. The determined serving DL access network devices may include at least one master DL access network devices, and zero, or one or more other serving DL access network devices.

In some example embodiments, after the first UL access network device 230-1 successfully decodes the access request, the first UL access network device 230-1 may calculate a related Timing Advance (TA) value and forward the access request to the central network device 220 along with the calculated TA value. Alternatively or in addition, the first UL access network device 230-1 may further report a received power indication of the access request to the central network device 220 such that the central network device 220 may determine one or more serving UL access network device for the terminal device 210, to further improve the communication efficiency.

For example, in the case that a plurality of UL access network devices in the first set of UL access network devices forwards the access request and report the corresponding received power indications, the central network device 220 may select UL access network devices with the received power above the configured threshold, as serving UL access network devices for the terminal device 210. Similar to the selection of serving DL access network devices, the selection of serving UL access network devices may also consider load situations and the number of served terminal devices. In some example embodiments, a UL access network device of the serving UL access network devices with the highest received power can be selected as a master UL access network device.

Upon reception of the access request, the central network device 220 transmits (325) an access response to a first set of DL access network devices 240 including the DL access network device 240-1. As an example, the access response may be carried in Message 2. Just for the purpose of illustration, only the DL access network device 240-1 is shown in FIG. 3. The first set of DL access network devices 240 may additionally include one or more other DL access network devices to leverage the spatial diversity to improve the transmission success probability. The first set of DL access network devices 240 may be selected from the serving DL access network devices determined by the central network device 220 based on the list of identifications of candidate DL access network devices in the access request. For example, the central network device 220 may transmit the access response to all of the determined serving DL access network devices or only to a serving DL access network device with the highest received power. It is also possible that the central network device 220 select other DL access network devices than the determined serving DL access network devices.

In some example embodiments, the access response may contain a list of identifications of serving UL access network devices and/or a list of identifications of serving DL access network devices. Accordingly, the terminal device 210 may immediately communicate with these serving UL and/or DL access network devices after the access procedure to improve the communication efficiency. Alternatively or in addition, the central network device 220 may assign an identifier (such as a UE ID) to the terminal device 210 for use in the following communications and include the identifier of the terminal device 210 into the access response. Alternatively or in addition, the access response may contain TA information related to the determined serving UL access network devices for use by the terminal device 210 in the following communication.

In this example as shown in FIG. 3, the DL access network device 240-1 receives (330) the access response and then forwards (335) the access response to the terminal device 210. Accordingly, the terminal device 210 receives (340) the access response from the DL access network device 240-1. If more than one DL access network devices 240 transmits the access response to the terminal device 210, the terminal device 210 may automatically combine the received power of the access responses from these DL access network devices 240, thereby leveraging the spatial diversity to improve the reception success probability of the access response.

In the case that the terminal device 210 consecutively transmits the access request to a plurality of UL access network devices in the first set of UL access network devices 230, the terminal device 210 may consecutively detect a plurality of versions of the access response from the first set of DL access network devices 240 and perform combination on these versions of the access response to improve the decoding performance. For example, the terminal device 210 may regard each access response from the individual DL access network devices as different HARQ retransmissions of the same source message, although these transmissions may occur at the same time. The terminal device 210 may process each access response independently, for example, till the soft-bit level. Then, the terminal device 210 may do soft-bit level combining of all the versions of the access response to final decode the access response. Till now, the terminal device 210 may have an access to the network.

In some example embodiments, in addition to the above exchanges of the access request and the access response, the access procedure may further involve the exchanges of a connection setup request and a connection setup response between the terminal device 210 and the network. Example embodiments in this aspect will be discussed below with reference to FIG. 4.

Figure 4:
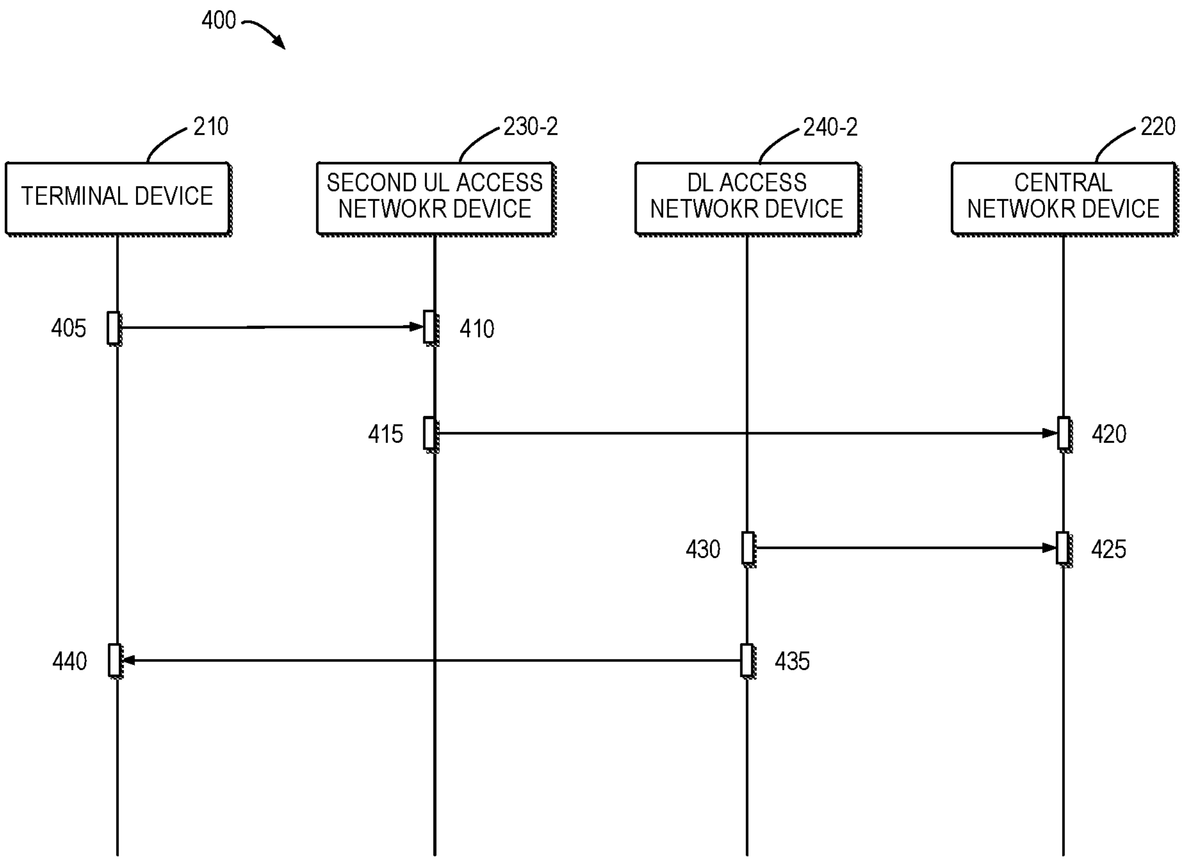
FIG. 4 illustrates a signaling flow between a terminal device, a second UL access network device, the DL access network device and a central network device according to some other example embodiments of the present disclosure.

FIG. 4 shows a signaling flow 400 between the terminal device 210, the UL access network device 230-2, the DL access network device 240-2 and the central network device 220 according to some example embodiments of the present disclosure.

As shown in FIG. 4, the terminal device 210 transmits (405) a connection setup request to a second set of UL access network devices 230 including the UL access network device 230-2 (referred to as a second UL device 230-2). As an example, the connection setup request may be carried in Message 3. The connection setup request may contain connection related information.

The connection setup request may be transmitted based on the scheduling of the central network device 220. For example, upon reception of the access request, the central network device 220 may schedule uplink resources for the transmission of the connection setup request, for example, to the selected master UL access network device, or other serving UL AP. In some example embodiments, if the terminal device 210 only sends the access request to one UL access network device, the central network device 220 may select one temporary master UL access network device for receiving the connection setup request. The central network device 220 may also inform all other serving UL access network devices to detect the coming connection setup request, so that the final master UL access network device as well as other potential serving UL access network device can be used to facilitate UL communication of the terminal device 210. In this case, the second set of UL access network devices 230 may comprise the scheduled serving UL access network devices, including the master UL access network device and other potential UL access network device.

The central network device 220 may include the scheduling information for the connection setup request into the access response. Accordingly, upon reception of the access response, the terminal device 210 may use the scheduled resources to transmit the connection setup request to the scheduled UL access network devices indicated by the access response.

In this example as shown in FIG. 4, the second UL access network device 230-2 receives (410) the connection setup request and forwards (415) the connection setup request to the central network device 220. The central network device 220 receives (420) the connection setup request from the second UL access network device 230-2, for example, as well as one or more other UL access network devices in the second set of UL access network devices. Upon the reception of the connection setup request, the central network device 220 may perform a connection related procedure.

In some example embodiments, the selection of the serving UL access network device may be performed by the central network device 220 from the second set of UL access network devices. In these embodiments, the second set of UL access network devices may measure the received power of the connection request from the terminal device 210 and report the received power indication to the central network device 220. In some example embodiments, the central network device 220 may instruct these UL access network devices to report the received power indication. Upon the reception of such an instruction, the second set of UL access network devices may transmit the received power indication of the connection request.

The second set of UL access network devices may additionally calculate the corresponding TA information and report it to the central network device 220. Accordingly, the central network device 220 may obtain the measured power and TA information and finally select the master UL access network device and other potential serving UL access network devices based on this information.

Then, the central network device 220 transmits (425) a connection setup response to a second set of DL access network devices 240 including the DL access network device 240-2 (referred to as a second DL access network device 240-2). The connection setup response may be carrier in Message 4, for example. In the case that the central network device 220 selects serving UL access network devices from the second set of UL access network devices, the central network device 220 may include a list of identifications of serving UL access network devices as well as the corresponding TA information into the connection setup response. In some example embodiments, the central network device 220 may include a list of identifications of serving DL access network devices into the connection setup response instead of the access response.

As shown in FIG. 4, the second DL access network device 240-2 receives (430) the connection setup response and forwards (435) the connection setup response to the terminal device 210. Accordingly, the terminal device 210 receives (440) the connection setup response from the second DL access network device 240-2 as well as one or more other DL access network devices in the second set of DL access network devices. For example, in the embodiments where the access response indicates the master DL access network device, the terminal device 210 may detect a control channel of the master DL access network device for the reception of the connection setup response. Then, the access procedure will be finished.

It is to be understood that some signal processing operations and actions of signal processing in the signaling flow 300 as described above with reference to FIG. 3 are likewise applicable in the signaling flow 400 and have similar effects. For the purpose of simplification, the details will be omitted.

Three specific example embodiments will be discussed below with reference to FIGS. 5-8 by taking a UE, UL/DL APs and a CPU as examples of the terminal device 210, the UL/DL access network devices 230 and 240 and the central network device 220.

Embodiment One

In Embodiment One, the UE only sends Message 1 carrying the access request once in the air interface. Message 1 includes a list of candidate DL AP IDs for the final decision by the CPU. At the network side, a plurality of UL APs will automatically check Message 1 from the UE and report Message 1 to the CPU based on the decoding results. The participation of the plurality of UL APs may leverage UL receiving spatial diversity to improve the transmission success probability of Message 1.

Figure 5:
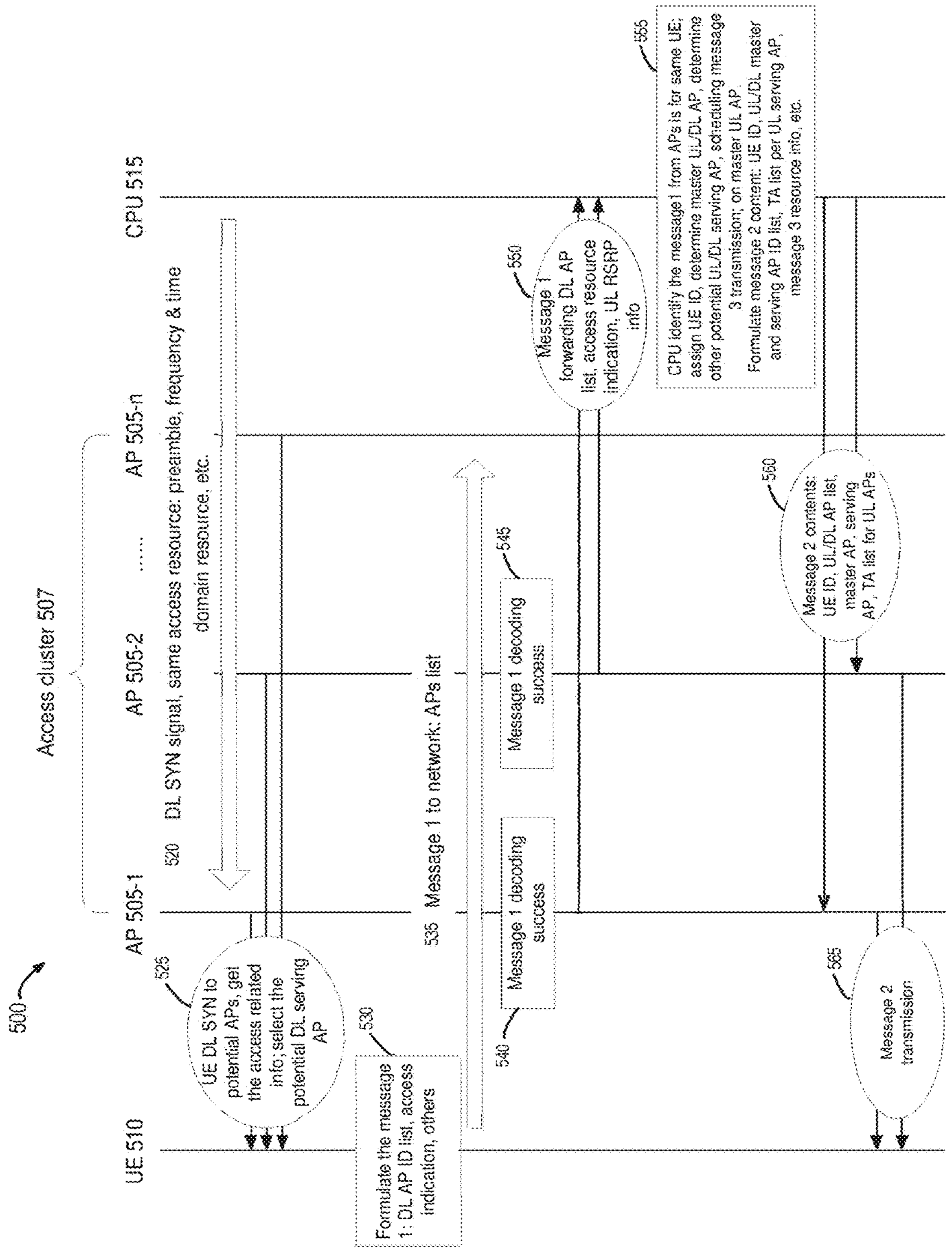
FIG. 5 illustrates a signaling flow of exchanging the access request and the access response according to some example embodiments of the present disclosure.

FIG. 5 shows a signaling flow 500 of exchanging the access request and the access response according to some example embodiments of the present disclosure.

As shown in FIG. 5, a plurality of APs 505-1, 505-2, . . . , **505-*n* (where n presents a positive integer greater than two) belongs to an access cluster 507. These APs 505-1, 505-2, . . . , 505-*n* all have the functions of UL and DL communications with a UE 510. To allow the participation of the plurality of APs 505-1, 505-2, . . . , 505-*n*, a CPU 515 may configure the same access related information to all the APs 505-1, 505-2, . . . , 505-*n*** within the same access cluster. The access related information may include random preamble information, radio resource for the signaling transmission of Message 1 and corresponding Message 2 containing the access response. All the UL APs within the same access cluster will try to detect the potential UL transmission of Message 1 on the configure resource.

As shown in FIG. 5, at 520, the CPU 515 performs DL SYN with the plurality of APs 505-1, 505-2, . . . , **505-*n*, to allocate the same access resource such as preamble, frequency and time domain resource, and the like. Before the initiation of a access procedure, at 525, the UE 510 achieves DL SYN to the potential APs 505-1, 505-2, . . . , 505-*n* and obtains the access related configuration so that UE knows when and where to send Message-1. In addition, at 525, the UE 510** may select the potential serving DL APs as the candidate DL APs.

After the prepare stage as mentioned above, the UE 510 can start the access procedure. As shown in FIG. 5, at 530, the UE 510 formulates Message 1 that contains a list of candidate DL AP identifications (IDs) and the access resource indication and other access related information. These AP IDs can be ordered according to pre-defined principle, such as in a descending or increase order of the received power.

The access resource indication and the list of DL AP IDs can be used to differentiate the access request from different UEs. That is, these two types of information are used to resolve the access conflict occurred during a random access procedure. The reason is that it is with very low probability that two different UEs will select the same access resource and indicate the same DL AP list in Message 1 in the same order. As will be mentioned below, at the network side, the CPU 515 will use these two types of information to identify Message 1 forwarded by multiple APs are from the same or different UEs, and take corresponding actions.

At 535, the UE 510 sends Message 1 once to the network over the air interface. Multiple APs within the same access cluster try to receive and decode Message 1 and forward the access request in Message 1 to the CPU 515. As described above, the CPU 515 configures the same access related resource to all UL APs within the same access cluster. So all these relevant UL APs will try to detect the potential transmission of Message 1 based on the configuration. In this way, although the UE 510 only sends Message 1 once over the air interface, it is possible that multiple APs will successfully decode Message 1 simultaneously. As such, the spatial diversity may be leveraged to improve the reception success probability of Message 1, which may achieve the benefits of cell-free transmission in the access stage.

In this example, at 540, the AP 505-1 decodes Message 1 successfully, and at 545, the AP 505-2 decodes Message 1 successfully. At 550, the APs 505-1 and 502-2 forward Message 1 to the CPU 515 to forward the list of candidate DL AP IDs and the access resource indication. In this example, at 550, the APs 505-1 and 502-2 also report its received power indication of Message 1 to the CPU 515 so that the CPU 515 may determine a list of serving UL AP IDs as will be discussed in the following paragraphs. The APs 505-1 and 502-2 may calculate the related TA values and forward Message 1 to the CPU 515 along with the calculated TA values.

At 555, the CPU 515 identifies that Message 1 from APs is transmitted by the same UE, assigns a UE ID to the UE 510, determines master UL/DL APs, determines other serving UL/DL APs and schedules Message 3 on the master and potential other serving UL AP. For example, the CPU 515 may differentiate different access requests from different UEs may be based on the access resource indication and the list of candidate DL AP IDs in Message 1. As an example, for Message 1 with the same access resource indication and the same candidate DL AP list, it is with high probability that Message 1 is from the same UE.

The CPU 515 may determine a master DL AP and other potential serving DL APs based on the candidate DL AP list provided by the UE 510 and other information such as load information of the corresponding APs, serving UE information, and the like. The finally confirmed serving DL APs may include at least one master DL AP, and zero or one or more other serving DL APs.

The CPU 515 may select and confirm the serving UL APs based on the input from UL APs which successfully decode and forward Message 1, and corresponding UL APs' other information, such as load information, served UE number, etc. As mentioned above, each UL AP with successful Layer 1 (L1) decoding will report its detection power information of Message 1. The CPU 515 may select the serving UL AP within them, for example, the UL AP with the received power above the configured threshold. The one with the highest UL received power may be selected as the master UL AP, while others may be confirmed as serving UL APs.

After that, the CPU 515 may schedule resource for Message 3 transmission, for example, on the just selected master UL AP, or other serving UL AP. The scheduling information may be included in Message 2 for the UE 510 to take the corresponding actions.

At 555, the CPU 515 also formulates Message 2 containing the UE ID, a list of a master UL/DL AP and serving UL/DL AP IDs, a TA list per serving UL AP and resources scheduled for Message 3. For example, the CPU 515 may generate and forward Message 2 contents to all selected DL serving AP for Message 2 transmission and inform these DL APs on which radio resource for transmission of Message 2.

In this example, At 560, the CPU 515 transmits Message 2 to the APs 505-1 and 505-2. At 565, upon the reception of Message 2, the APs 505-1 and 505-2 send down Message 2 to the UE 510 to leverage the spatial diversity to improve the transmission success probability of Message 2. These transmissions may use the same radio resource indicated by CPU.

Such transmission of Message 2 is totally transparent to the UE 510. At the UE side, the power of all DL APs will be added together to get power combining gain, thereby improving the decoding success probability of Message 2. After this, the UE 510 will know its UE ID, the UL/DL serving AP list and the UL AP and corresponding resource for transmission of Message 3 carrying the connection setup request. Till now, the UE 510 and the CPU 515 are synchronized on which AP lists will be used for UL and DL communications, so that cell-free UL/DL transmission can be performed immediately after the access procedure is finished.

Figure 6:
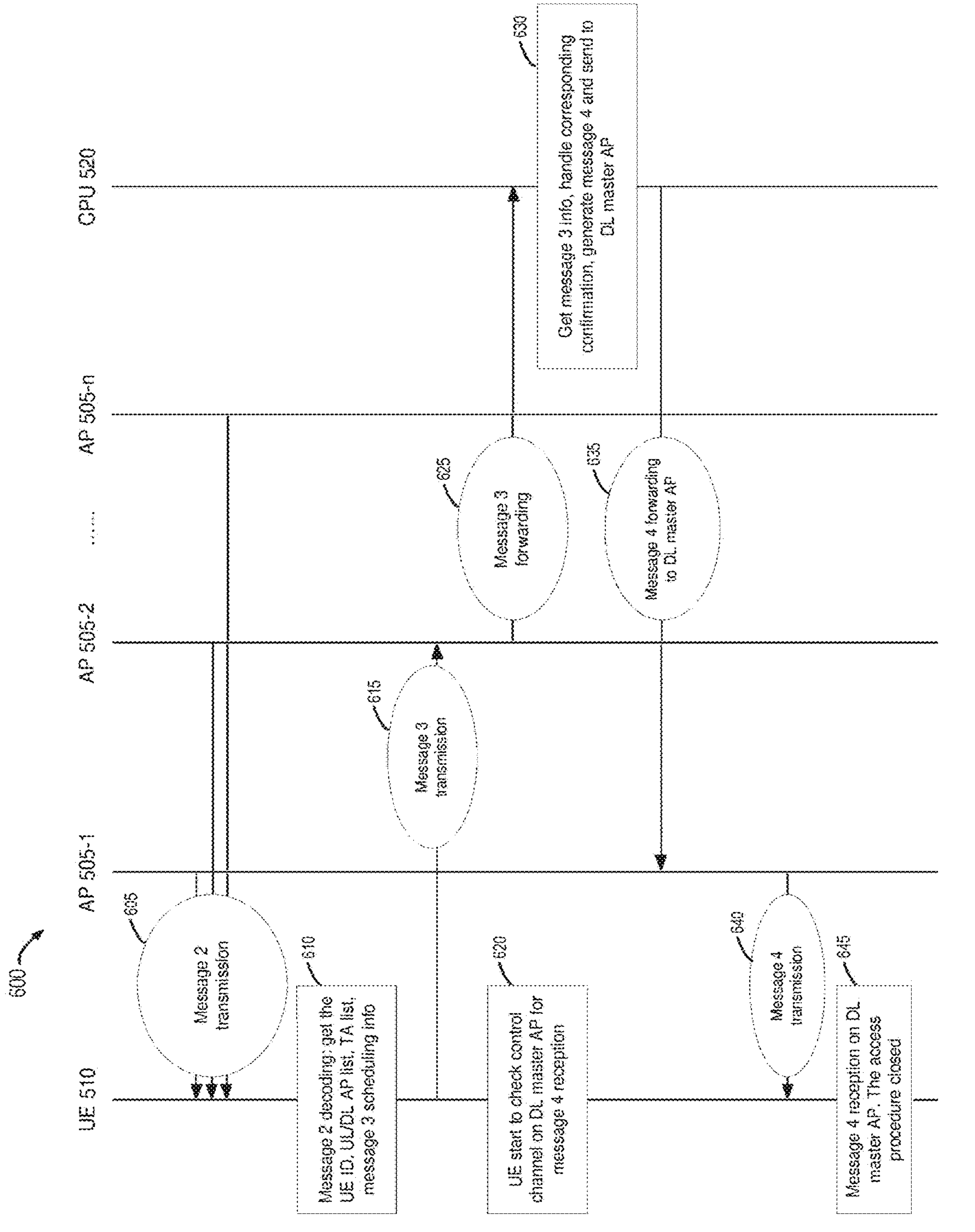
FIG. 6 illustrates a signaling flow of exchanging the connection setup request and the connection setup response according to some example embodiments of the present disclosure.

FIG. 6 shows a signaling flow 600 of exchanging the connection setup request and the connection setup response according to some example embodiments of the present disclosure.

In this example, as shown in FIG. 6, at 605, the APs 505-1, 505-2, . . . , **505-*n* all transmits Message 2 to the UE 510. At 610, the UE 510 automatically combines Message 2 from the multiple APs 505-1, 505-2, . . . , 505-*n* and decodes Message 2. Upon the decoding of Message 2, the UE 510** obtains the UE ID, the UL/DL AP list, and the TA list and the scheduling information for Message 3.

At 615, the UE 510 transmits Message 3 to the AP 505-2 indicated by Message 2, which can include connection related information. After the transmission of Message 3, at 620, the UE 510 starts to check a control channel on the master DL AP (for example, the AP 505-1) for the reception of Message 4 carrying the connection setup response.

At 625, the AP 505-2 decodes Message 3 and forwards to the CPU 515 for connection related configuration. At 630, the CPU 515 receives Message 3, performs the confirmation of the serving UL/DL APs and generates Message 4. At 635, the CPU 515 sends Message 4 to the AP 505-1 as the master DL AP. For example, after the CPU 515 completes the connection related procedure, the CPU 515 schedules the transmission of Message 4, for example, on the DL master AP, and forwards Message 4 to the corresponding serving DL AP for transmission.

At 640, the AP 505-1 transmits Message 4 to the UE 510 to confirm the connection setup. At 645, the UE 510 receives Message 4 to complete the access procedure. Till now, the UE 510 and the network are synchronized on all assigned serving UL/DL APs, and the access procedure is finished.

Embodiment Two

In Embodiment Two, the UE sends Message 1 one by one to multiple UL APs, to report the potential candidates DL AP list, besides the access related information. Here, the DL candidate AP list may be represented in a matrix to differentiate the access requests from same or different UEs. After the transmission of Message 1, the UE may try to check DL transmission of Message 2 on potential DL APs with resources linked to the corresponding transmission of Message 1.

At the network side, similar to Embodiment One, multiple UL APs may try to decode Message 1 independently and report the decoding results to the CPU, along with its UL received power information. After obtaining the forwarded information from one or multiple UL APs, the CPU may make a decision to select the master DL AP and other serving DL APs within candidate DL APs reported by the UE. Moreover, the CPU may determine a list of the master UL AP and other potential serving UL AP within those UL APs reporting the reception of Message 1. Another important function of the CPU is to schedule transmission of Message 3 on UL APs in the list of potential serving UL APs, with same or different radio resources. The CPU may include the information in Message 2, and forward it to those DL APs, on which the UE is waiting for DL transmission of Message 2.

The reception process of Message 2 is also different to that of Embodiment One. In Embodiment One, Message 2 is sent from different DL APs on the same radio resource. The UE only needs to combine the received power from the DL APs to improve decoding performance of Message 2. While in Embodiment Two, Message 2 is sent from DL APs potentially with different radio resources. The UE may regard Message 2 from the individual DL APs as different HARQ retransmissions of the same source message, although these transmissions occurred at the same time. Thus, the UE may process transmission of each DL AP independently till the soft-bit level. Then, the UE may do soft-bit level combining of Message 2 from all DL As to final decode Message 2 for the next step.

Regarding the transmission of Message 3, there is no difference to Embodiment One, which is based on the indication in Message 2. After that, the UE may try to check Message 4 on the master DL AP assuming the CPU may schedule Message 4 at least on selected master DL AP. While at the network side, the corresponding UL APs decode Message 3 and forward it to the CPU for final processing. At the end, the CPU configures the connection related process and schedule Message 4 at least on the master DL AP. It is also possible to schedule Message 4 on other serving DL AP, but may use the same radio resource as that of master DL AP. The purpose is to achieve power combining gain at the UE side for Message 4 reception to improve the success probability.

In summary, Embodiment Two has following differences to Embodiment One. Regarding UL transmission of Message 1, Message 1 is transmitted to multiple UL APs one by one with same or different radio resources. Regarding DL transmission of Message 2, Message 2 is transmitted from multiple DL APs respectively, with same or different radio resources. The UE knows the radio resource to receive each Message 2. While in Embodiment One, the UE may not know that from which DL APs Message 2 may be transmitted, but the UE just knows that which radio resource may be used to send Message 2. So the UE only needs to check the corresponding radio resource and combings all received power on this resource for processing of Message 2.

Regarding DL reception of Message 2, the UE may independently process each DL Message 2 till the soft bit level, and then combine each Message 2 like the HARQ combining process to get the combining gain. While for Embodiment One, as mentioned above, UE can achieve power combining gain but not HARQ-combining-like gain.

Embodiment Three

In Embodiment One and Embodiment Two, regardless how many number of transmissions of Message 1 over the air, multiple UL APs may try to receive Message 1 and report the results to the CPU. Multiple DL APs may be scheduled to send Message 2 over the air interface. After reception of Message 2 at UE side, the UE and the CPU are aligned on the selected multiple serving UL/DL APs, including one master UL/DL AP and zero, or one or more other serving UL/DL APs.

Embodiment Three gives another possibility where serving UL APs and serving DL APs are selected in the different stages of the access procedure. In Embodiment Three, the UE first selects the temporary master DL AP as well as other potential serving DL APs. and include the list of the candidate DL AP IDs in Message 1, similar as Embodiment One and Embodiment Two. Message 1 is sent to one UL AP, which might be linked to the temporary selected master DL AP. After transmission of Message 1, the UE starts to wait for Message 2 on the AP over the resource linked to the access information of Message 1.

Only one UL AP may receive Message 1 and report the content of Message 1 to the CPU. After that, the CPU may finally decide the master DL AP and other potential serving DL AP, based on the candidate AP IDs list from UE side. While for UL transmission, the CPU can only select the temporary master UL AP at this stage, which is the UL AP with reception of Message 1. In the following, the CPU may schedule transmission of Message 2 on the DL AP over the resource linked to previous access information in Message 1. In addition, the CPU may schedule transmission of Message 3 on the just temporary selected UL AP. Another important action at the CPU side is to provide the transmission resource for Message 3 to all other UL APs within the access cluster 507. This is to help the CPU to select the final serving UL APs after Message 3 is received.

Based on the above principles, Message 2 is sent only once over the air on the DL AP linked to the transmission of Message 1. At the UE side, after Message 2 is received, the UE knows the finally selected master DL AP and other serving DL APs. Based on Message 2, UE sends Message 3 only once to the corresponding UL AP. After that, UE may try to check the control channel of the selected master DL AP.

In the following, at the network side, the CPU has already notified multiple UL APs on the resource to be used by Message 3. Multiple UL APs, besides the temporary master UL AP, may measure the received power of Message 3 and calculate the corresponding TA information, and report these information to the CPU accordingly. While the temporary UL AP may decode Message 3 and forward the content to the CPU for following processing. At the CPU side, it may get the measured power information and TA of potential UL APs as well as the content in Message 3. Based on this information, the CPU may finally select the master UL AP and other potential serving UL AP. Then, the CPU may include such information as well as the corresponding TA information in Message 4 and inform it to the UE later.

Compared with Embodiment One and Embodiment Two, in Embodiment Three, Message 1, Message 2 and Message 3 may be sent only once over the air. Only one UL or DL AP may be responsible for reception or transmission of Message 1 or 2 respectively. There is no spatial diversity and combining gain achieved for the processing of these two messages. Only for the reception of Message 3, multiple UL APs may be involved. So master and serving DL APs may be confirmed after the processing of Message 2. While the master and serving UL AP may be confirmed after the processing of Message 3.

Figure 7:
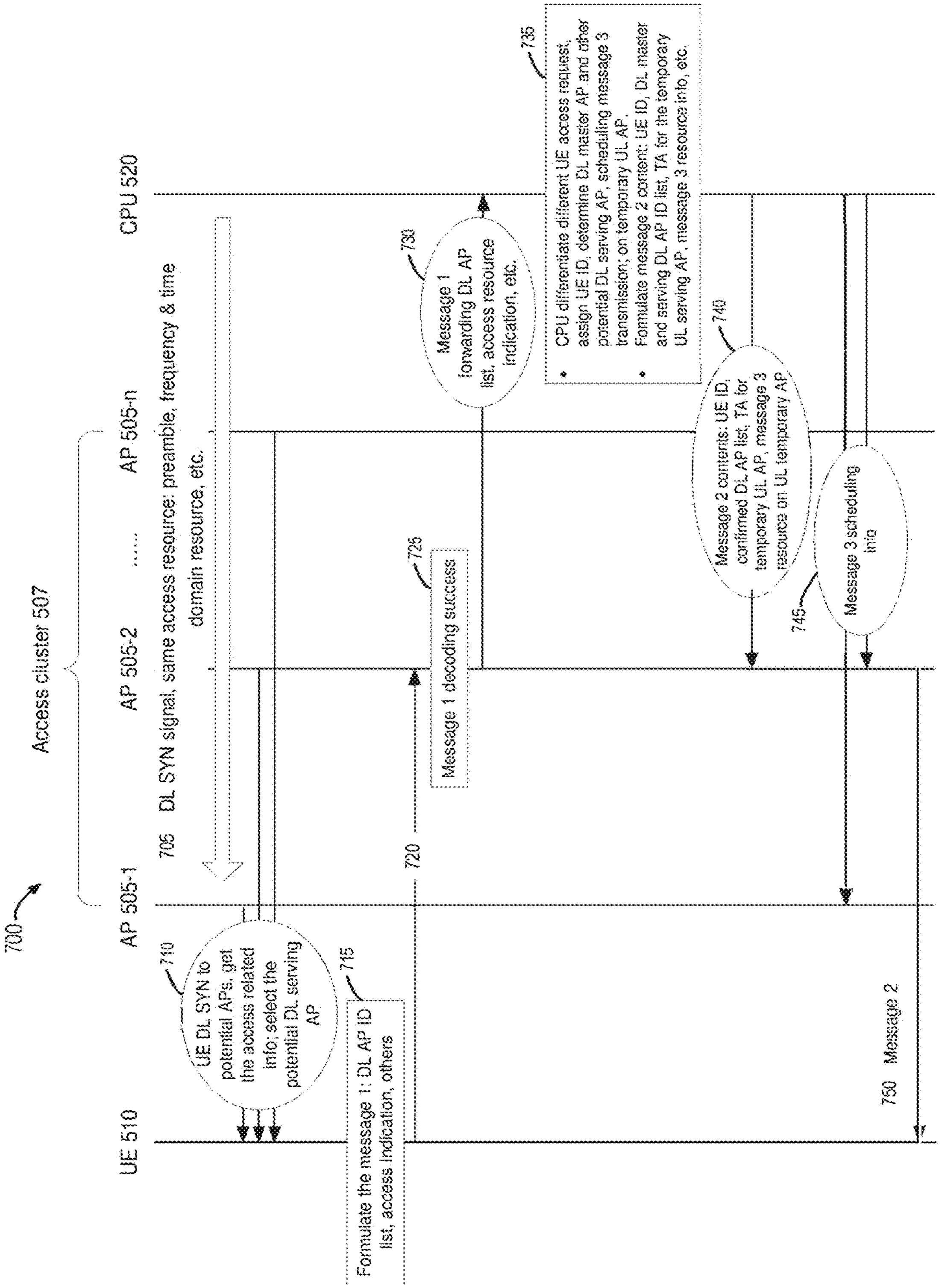
FIG. 7 illustrates a signaling flow of exchanging Message 1 and Message 2 according to some example embodiments of the present disclosure.

FIG. 7 shows a signaling flow 700 of exchanging Message 1 and Message 2 according to some example embodiments of the present disclosure.

As shown in FIG. 7, at 705, the CPU performs DL SYN with the plurality of APs 505-1, 505-2, . . . , **505-*n*, to allocate the same access resource such as preamble, frequency and time domain resource, and the like. At 710, the UE 510 achieves DL SYN to the potential APs 505-1, 505-2, . . . , 505-*n*, obtains the access related configuration, and selects the potential serving DL APs as the candidate DL APs. At 715, the UE 510 formulates Message 1 that contains a list of candidate DL AP IDs and the access resource indication and other access related information. The processing at 705, 710 and 715 are similar to the processing at 520, 525 and 530**. For the purpose of simplification, the details will be omitted.

At 720, the UE 510 sends Message 1 only to the AP 505-2. At 725, the AP 505-2 decodes Message 1 successfully, and at 730, the AP 505-2 forwards Message 1 to the CPU 515 which includes the DL AP list, the access resource indication and the like. At 735, the CPU 515 differentiates different access requests from different UEs, assigns one UE ID to the UE 510, determines a master DL AP and other serving DL APs and schedules Message 3 on temporary UL AP(s) and formulates Message 2 containing the UE ID, a list of a master DL AP ID and serving DL AP IDs, TA for the temporary UL AP(s), resources scheduled for Message 3. At 740, the CPU 515 sends Message 2 to the AP 505-2. At 745, the CPU 515 sends the scheduling information for Message 3 to the APs 505-1 and 505-2. At 750, the AP 505-2 transmits Message 3 to the UE 510.

Figure 8:
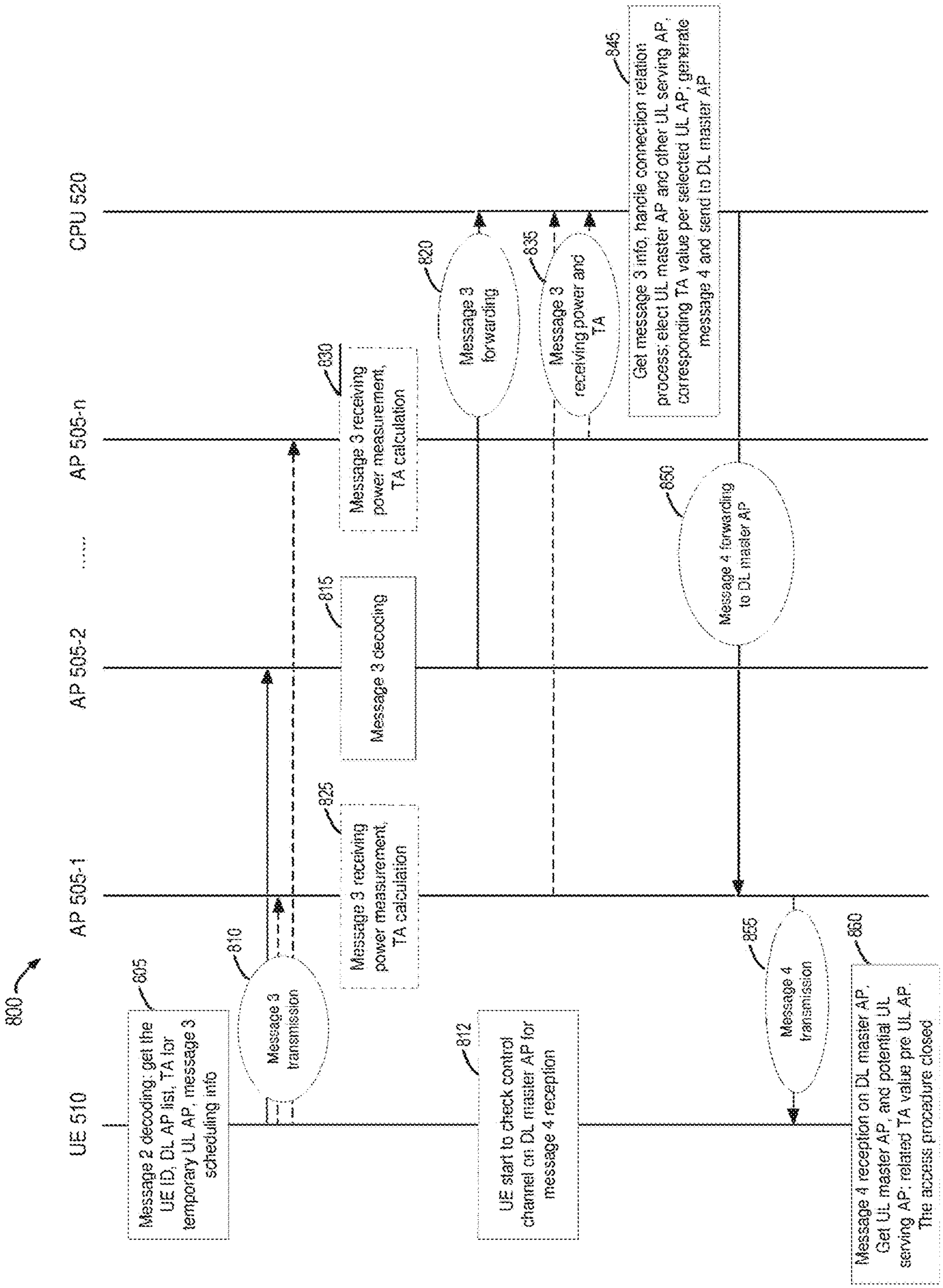
FIG. 8 illustrates a signaling flow of exchanging Message 3 and Message 4 according to some example embodiments of the present disclosure.

FIG. 8 shows a signaling flow 800 of exchanging Message 3 and Message 4 according to some example embodiments of the present disclosure.

As shown in FIG. 8, at 805, the UE 510 decodes Message 2 and obtains the UE ID, the UL/DL AP list, and the TA list and the scheduling information for Message 3. At 810, the UE 510 transmits Message 3 to the AP 505-2 as a master UL AP. Other serving UL APs such as the AP 505-1 and **505-*n* may also detect Message 3 from the UE 510. At 812, the UE 510 starts to check a control channel on the master DL AP (for example, the AP 505-1**) for the reception of Message 4

At 815, the AP 505-2 decodes Message 3, and at 820, the AP 505-2 forwards Message 3 to the CPU 515 for connection related configuration. Optionally, at 825, the AP 505-1 may perform the measurements of the received power of Message 3 and calculate the TA information. Likewise, at 830, the AP **505-*n* may perform the measurements of the received power of Message 3 and calculate the TA information. Then, the APs 505-1 and 505-*n* may send (835) Message 3 to the CPU 515** as well as the received power indication and the TA information.

At 845, the CPU 515 obtains the information in Message 3, perform the connection related processing, selected the master UL AP and other serving UL APs, calculates the corresponding TA value per selected UL AP and generates Message 4. At 850, the CPU 515 sends Message 4 to the AP 505-1 as the master DL AP. At 855, the AP 505-1 transmits Message 4 to the UE 510 to confirm the connection setup. At 860, the UE 510 receives Message 4 from the master DL AP and obtains information about the master UL AP and potential serving UL APs and related TA values per UL AP.

All operations and processing as described above with reference to FIGS. 5 and 6 are likewise applicable to the flow 700 and 800 and have similar effects. For the purpose of simplification, the details will be omitted.

The above three embodiments provide an access procedure to support cell-free MIMO transmission in the 6G stage. Multiple APs for both of UL and DL communications may be determined respectively during the access procedure to achieve benefits from the cell-free MIMO transmission. Moreover, Multiple APs receptions/transmission can be leveraged to improve the success probability of the access and connection setup procedure. In addition, the serving DL and UL APs may be selected independently, which gives chance to support different UL/DL serving APs and guarantees optimized UL and DL communication simultaneously.

Figure 9:
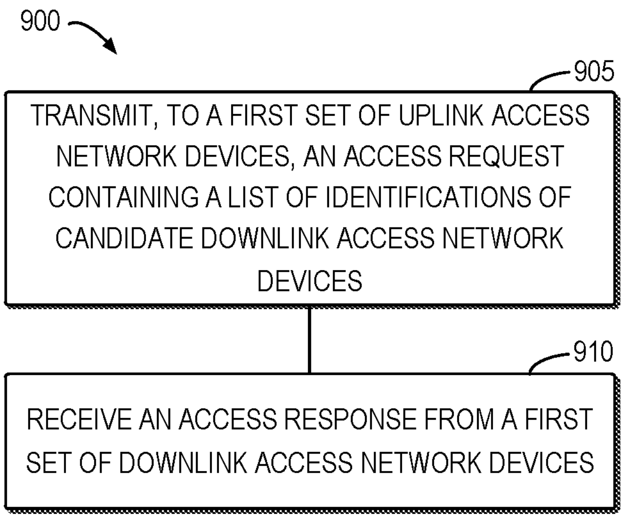
FIG. 9 illustrates a flowchart of an example method at a terminal device according to some example embodiments of the present disclosure.

FIG. 9 shows a flowchart of an example method 300 according to some example embodiments of the present disclosure. The method 300 may be implemented by the network device 110. For the purpose of discussion, the method 300 will be described with reference to FIG. 1.

At block 305, the network device 110 determines an update pattern for one or more currently configured parameters to be used by the terminal device 210 in an inactive mode to initiate a connection resume attempt. For example, the network device 110 may configure which input parameter (KEY, PDCP COUNT, MESSAGE DIRECTION, BEARER) the UE shall update and with which step size. In some example embodiments, the network device 110 may configure an order for the input parameters in which they need to be updated by the terminal device 210. In some example embodiments, it may be specified that one of the parameter (for example, PDCP COUNT used for resumeMAC-I generation) is updated while the update pattern is configured by the network device 110.

At block 310, the network device 110 sends to the terminal device 210 an indication of the update pattern for the one or more currently configured parameters. For example, upon releasing the terminal device 210 to an inactive mode such as RRC_INACTIVE mode, the network device 110 may send an indication how the input parameters for resumeMAC-I is to be updated by the terminal device 210 to generate a new resumeMAC-I for a connection resume attempt (either for SDT or non-SDT).

At block 315, using one or more updated parameters generated by updating the one or more parameters based on the update pattern, the network device 110 detects the connection resume attempt from the terminal device 210. For example, the network device 110 may detect a connection resume request from the terminal device 210, using the one or more updated parameters. The connection resume request may contain resumeMAC-I generated based on the one or more updated parameters.

In some example embodiments, the terminal device 210 may not perform a SDT procedure with the updated resumeMAC-I but only perform a non-SDT procedure (such as a regular RRC Resume procedure), for example, after SDT procedure has been rejected, or upon non-SDT data arrival or cell reselection during the SDT procedure. Based on the updated resumeMAC-I, the network device 110 may deduce that the terminal device 210 has performed SDT previously. In this case, the network device 110 may trigger a key change and PDCP entity(ies) re-establishment for SDT-DRBs (as these may have already used the key for data upon the SDT transmission) when the connection is resumed. For example, upon completion of a connection resume procedure initiated by the terminal device 210, the network device 110 may transmit to the terminal device 210 an indication of a changed value of the key for bearers including SDT DRBs or other bearers.

In some example embodiments, the network device 110 may configure how many resume attempts the terminal device 210 can perform by updating the input parameters. After the maximum number of resume attempts have been performed, the terminal device 210 may go to an IDLE mode.

In some example embodiments, the network device 110 may indicate to the terminal device 210 whether or not input parameters shall be updated. In case input parameter update is not allowed, the terminal device 210 may go to an IDLE mode. The indication may be transmitted in a connection reject message such as a RRC Reject message.

FIG. 9 shows a flowchart of an example method 900 according to some example embodiments of the present disclosure. The method 900 can be implemented at the terminal device 210 as shown in FIG. 2. For the purpose of discussion, the method 900 will be described with reference to FIG. 2.

At block 910, the terminal device 210 transmits, to a first set of uplink access network devices, an access request containing a list of identifications of candidate downlink access network devices. At block 920, the terminal device 210 receives an access response from a first set of downlink access network devices.

In some example embodiments, the access request may further contain an access resource indication.

In some example embodiments, the access response may contain at least one of a list of identifications of serving uplink access network devices, or a list of identifications of serving downlink access network devices.

In some example embodiments, the access response may contain one or more scheduled uplink resources for a connection setup request. The terminal device 210 may further transmit to a second set of uplink access network device, a connection setup request on the one or more scheduled uplink resources. Further, terminal device 210 may receive a connection setup response from a second set of downlink access network devices.

In some example embodiments, the connection setup response may contain at least one of a list of identifications of serving uplink access network devices, or a list of identifications of serving downlink access network devices.

In some example embodiments, the first set of uplink access network devices may comprise a plurality of uplink access network devices. The terminal device 210 may transmit the access request by consecutively transmitting the access request to respective uplink access network devices of the plurality of uplink access network devices.

In some example embodiments, the terminal device 210 may receive the access response by consecutively detecting a plurality of versions of the access response from the first set of downlink access network devices. Further, the terminal device 210 may perform combining on the plurality of versions of the access response.

In some example embodiments, the identifications of the candidate downlink access network devices are ordered based on received powers of signals from the candidate downlink access network devices.

Figure 10:
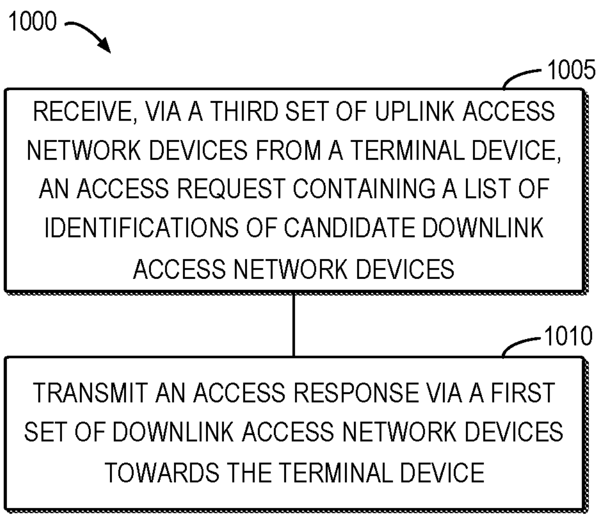
FIG. 10 illustrates a flowchart of an example method at a central network device according to some example embodiments of the present disclosure.

FIG. 10 shows a flowchart of an example method 1000 according to some example embodiments of the present disclosure. The method 1000 can be implemented at the central network device 220 as shown in FIG. 2. For the purpose of discussion, the method 1000 will be described with reference to FIG. 2.

At block 1010, the central network device 220 receives, via a set (referred to as a third set) of uplink access network devices from a terminal device, an access request containing a list of identifications of candidate downlink access network devices. At block 1020, the central network device 220 transmits an access response via a first set of downlink access network devices towards the terminal device.

In some example embodiments, the access request may further contain an access resource indication.

In some example embodiments, the access response may contain one or more scheduled resources for a connection setup request of the terminal device. The central network device 220 may further receive a connection setup request via a set (referred to as a fourth set) of uplink access network devices from the terminal device. Further, the central network device 220 may transmit a connection setup response via a second set of downlink access network devices towards the terminal device.

In some example embodiments, the access response may contain a list of identifications of serving uplink access network devices. The central network device 220 may further receive, from the third set of uplink access network devices, a set of received power indications of the access request. Further, the central network device 220 may determine at least in part based on the set of received power indications, one or more uplink access network devices from the third set of uplink access network devices as one or more serving uplink access network devices for the terminal device.

In some example embodiments, the fourth set of uplink access network devices may be selected from the one or more serving uplink access network devices.

In some example embodiments, the connection setup response may contain a list of identifications of serving uplink access network devices. The central network device 220 may further receive, from the fourth set of uplink access network devices, a set of received power indications of the connection setup request. Further, the central network device 220 may determine, based on the set of received power indications, one or more uplink access network devices from the fourth set of uplink access network devices as one or more serving uplink access network devices for the terminal device.

In some example embodiments, rhe central network device 220 may further transmit an instruction to a fifth set of uplink access network devices to report a received power indication of the connection setup request, the fifth set of uplink access network devices including at least the fourth set of uplink access network devices.

In some example embodiments, the third set of uplink access network devices may comprise a plurality of uplink access network devices in an access cluster. The central network device 220 may further allocate an access related resource to uplink access network devices in the access cluster.

In some example embodiments, the central network device 220 may further determine one or more serving downlink access network devices based on the list of identifications of candidate downlink access network devices. Further, the access response or the connection setup response may contain a list of identifications of the determined one or more serving downlink access network devices.

In some example embodiments, the second set of downlink access network devices may be selected from the determined one or more serving downlink access network devices.

In some example embodiments, the identifications of the candidate downlink access network devices may be ordered based on received power of signals from the candidate downlink access network devices.

In some example embodiments, the access request may further comprise an access resource indication. The central network device 220 may further identify based on at least one of the access resource indication, the list of identifications of candidate downlink access network devices or the order of the identifications of the candidate downlink access network devices, that the access request is transmitted by the terminal device.

Those skilled in the art can understand that all operations and features as described above with reference to FIGS. 2-4 are likewise applicable to the method 1000 and have similar effects.

Figure 11:
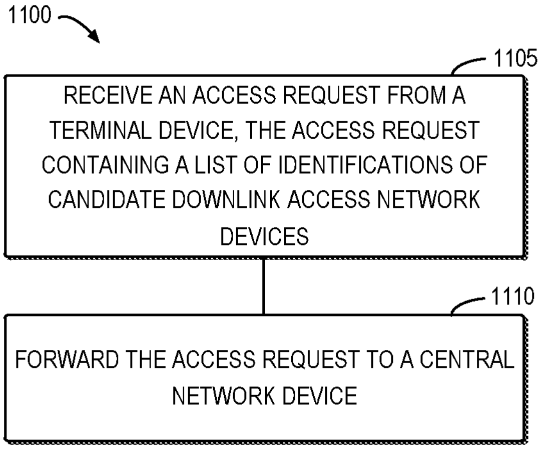
FIG. 11 illustrates a flowchart of an example method at a first UL access network device according to some example embodiments of the present disclosure.

FIG. 11 shows a flowchart of an example method 1100 according to some example embodiments of the present disclosure. The method 1100 can be implemented at the first uplink access network device 230-1 as shown in FIG. 2. For the purpose of discussion, the method 1100 will be described with reference to FIG. 2.

At block 1110, the first uplink access network device 230-1 receives an access request from a terminal device, the access request containing a list of identifications of candidate downlink access network devices. At block 1120, the first uplink access network device 230-1 forwards the access request to a central network device.

In some example embodiments, the identifications of the candidate downlink access network devices may be ordered based on received powers of signals from the candidate downlink access network devices.

In some example embodiments, the first uplink access network device 230-1 may further send a received power indication of the access request to the central network device.

Figure 12:
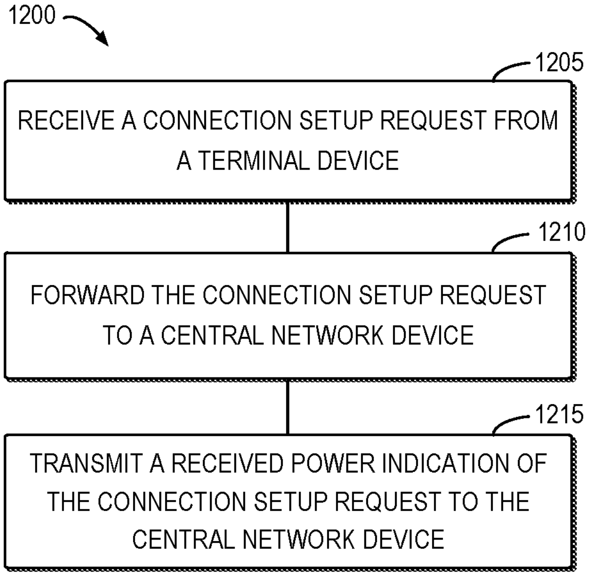
FIG. 12 illustrates a flowchart of an example method at a second UL access network device according to some example embodiments of the present disclosure.

FIG. 12 shows a flowchart of an example method 1200 according to some example embodiments of the present disclosure. The method 1200 can be implemented at the second uplink access network device 230-2 as shown in FIG. 2. For the purpose of discussion, the method 1200 will be described with reference to FIG. 2.

At block 1210, the second uplink access network device 230-2 receives a connection setup request from a terminal device. At block 1220, the second uplink access network device 230-2 forwards the connection setup request to a central network device. At block 1230, the second uplink access network device 230-2 transmits a received power indication of the connection setup request to the central network device.

In some example embodiments, the second uplink access network device 230-2 may receive the connection setup request from the terminal device by in response to receiving an instruction from the central network device to receive the connection setup request, receiving the connection setup request from the terminal device.

In some example embodiments, the second uplink access network device 230-2 may transmit the received power indication of the connection setup request to the central network device by in response to receiving an instruction from the central network device to report the received power indication of the connection setup request, transmitting the received power indication of the connection setup request to the central network device.

All operations and features as described above with reference to FIGS. 2-8 are likewise applicable to the method 900 to the method 1200 and have similar effects. For the purpose of simplification, the details will be omitted.

Figure 13:
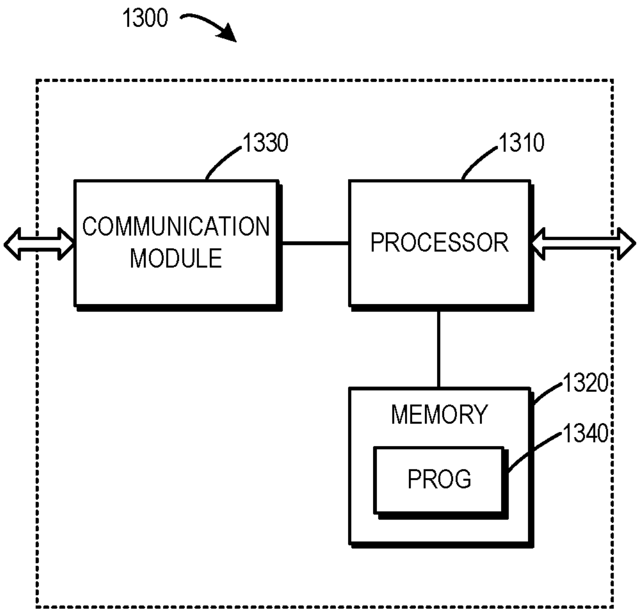
FIG. 13 illustrates a simplified block diagram of a device that is suitable for implementing example embodiments of the present disclosure.

FIG. 13 is a simplified block diagram of a device 1300 that is suitable for implementing example embodiments of the present disclosure.

As shown, the device 1300 includes a processor 1310, a memory 1320 coupled to the processor 1310, a communication module 1330 coupled to the processor 1310, and a communication interface (not shown) coupled to the communication module 1330. The memory 1320 stores at least a program 1340. The communication module 1330 is for bidirectional communications, for example, via multiple antennas. The communication interface may represent any interface that is necessary for communication.

The program 1340 is assumed to include program instructions that, when executed by the associated processor 1310, enable the device 1300 to operate in accordance with the example embodiments of the present disclosure, as discussed herein with reference to FIGS. 2-12. The example embodiments herein may be implemented by computer software executable by the processor 1310 of the device 1300, or by hardware, or by a combination of software and hardware. The processor 1310 may be configured to implement various example embodiments of the present disclosure.

The memory 1320 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1320 is shown in the device 1300, there may be several physically distinct memory modules in the device 1300. The processor 1310 may be of any type suitable to the local technical network, and may include one or more of general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

When the device 1300 acts as the terminal device 210, the processor 1310 and the communication module 1330 may cooperate to implement the operations and features at the terminal device 210 as described above with reference to FIGS. 2-12. When the device 1300 acts as the first UL access network device 230-1 or the second UL access network device 230-2, the processor 1310 and the communication module 1330 may cooperate to implement the operations and features at the first UL access network device 230-1 or the second UL access network device 230-2 as described above with reference to FIGS. 2-12. When the device 1300 acts as the central network device 220, the processor 1310 and the communication module 1330 may cooperate to implement the operations and features at the central network device 220 as described above with reference to FIGS. 2-12.

All operations and features as described above with reference to FIGS. 2-12 are likewise applicable to the device 1300 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method or the process or the signaling flow as described above with reference to FIGS. 2-12. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, a method comprises: transmitting, by a terminal device, to a first set of uplink access network devices, an access request containing a list of identifications of candidate downlink access network devices; and receiving, by the terminal device, an access response from a first set of downlink access network devices.

In some example embodiments, the access request further contains an access resource indication.

In some example embodiments, the access response contains at least one of a list of identifications of serving uplink access network devices, or a list of identifications of serving downlink access network devices.

In some example embodiments, the access response contains one or more scheduled uplink resources for a connection setup request, and the method further comprises: transmitting, by the terminal device, to a second set of uplink access network device, a connection setup request on the one or more scheduled uplink resources; and receiving, by the terminal device, a connection setup response from a second set of downlink access network devices.

In some example embodiments, the connection setup response contains at least one of a list of identifications of serving uplink access network devices, or a list of identifications of serving downlink access network devices.

In some example embodiments, the first set of uplink access network devices comprises a plurality of uplink access network devices, and transmitting the access request comprises: consecutively transmitting, by the terminal device, the access request to respective uplink access network devices of the plurality of uplink access network devices.

In some example embodiments, receiving the access response comprises: consecutively detecting, by the terminal device, a plurality of versions of the access response from the first set of downlink access network devices; and performing combining on the plurality of versions of the access response.

In some example embodiments, the identifications of the candidate downlink access network devices are ordered based on received powers of signals from the candidate downlink access network devices.

In some aspects, a method comprises: receiving, by a central network device via a third set of uplink access network devices from a terminal device, an access request containing a list of identifications of candidate downlink access network devices; and transmitting, by the central network device, an access response via a first set of downlink access network devices towards the terminal device.

In some example embodiments, the access request further contains an access resource indication.

In some example embodiments, the access response contains one or more scheduled resources for a connection setup request of the terminal device, and the method further comprises: receiving, by the central network device, a connection setup request via a fourth set of uplink access network devices from the terminal device; and transmitting, by the central network device, a connection setup response via a second set of downlink access network devices towards the terminal device.

In some example embodiments, the access response contains a list of identifications of serving uplink access network devices, and the method further comprises: receiving, from the third set of uplink access network devices, a set of received power indications of the access request; and determining, at least in part based on the set of received power indications, one or more uplink access network devices from the third set of uplink access network devices as one or more serving uplink access network devices for the terminal device.

In some example embodiments, the fourth set of uplink access network devices is selected from the one or more serving uplink access network devices.

In some example embodiments, the connection setup response contains a list of identifications of serving uplink access network devices, and the method further comprises: receiving, from the fourth set of uplink access network devices, a set of received power indications of the connection setup request; and determining, based on the set of received power indications, one or more uplink access network devices from the fourth set of uplink access network devices as one or more serving uplink access network devices for the terminal device.

In some example embodiments, the method further comprises: transmitting an instruction to a fifth set of uplink access network devices to report a received power indication of the connection setup request, the fifth set of uplink access network devices including at least the fourth set of uplink access network devices.

In some example embodiments, the third set of uplink access network devices comprises a plurality of uplink access network devices in an access cluster, and the method further comprises: allocating an access related resource to uplink access network devices in the access cluster.

In some example embodiments, the method further comprises: determining one or more serving downlink access network devices based on the list of identifications of candidate downlink access network devices. Further, the access response or the connection setup response contains a list of identifications of the determined one or more serving downlink access network devices.

In some example embodiments, the second set of downlink access network devices is selected from the determined one or more serving downlink access network devices.

In some example embodiments, the identifications of the candidate downlink access network devices are ordered based on received power of signals from the candidate downlink access network devices.

In some example embodiments, the access request further comprises an access resource indication, and the method further comprises: identifying, based on at least one of the access resource indication, the list of identifications of candidate downlink access network devices or the order of the identifications of the candidate downlink access network devices, that the access request is transmitted by the terminal device.

In some aspects, a method comprises: receiving, by a first uplink access network device, an access request from a terminal device, the access request containing a list of identifications of candidate downlink access network devices; and forwarding, by the first uplink access network device, the access request to a central network device.

In some example embodiments, the identifications of the candidate downlink access network devices are ordered based on received powers of signals from the candidate downlink access network devices.

In some example embodiments, the method further comprises: sending a received power indication of the access request to the central network device.

In some aspects, a method comprises: receiving, by a second uplink access network device, a connection setup request from a terminal device; forwarding, by the second uplink access network device, the connection setup request to a central network device; and transmitting, by the second uplink access network device, a received power indication of the connection setup request to the central network device.

In some example embodiments, receiving the connection setup request from the terminal device comprises: in response to receiving an instruction from the central network device to receive the connection setup request, receiving the connection setup request from the terminal device.

In some example embodiments, transmitting the received power indication of the connection setup request to the central network device comprises: in response to receiving an instruction from the central network device to report the received power indication of the connection setup request, transmitting the received power indication of the connection setup request to the central network device.

In some aspects, an apparatus implemented at a terminal device comprises: at least one processor; and at least one memory including computer program code; the at least one memory and the computer program code configured to, with the at least one processor, cause the apparatus to: transmit to a first set of uplink access network devices, an access request containing a list of identifications of candidate downlink access network devices; and receive an access response from a first set of downlink access network devices.

In some example embodiments, the access request further contains an access resource indication.

In some example embodiments, the access response contains at least one of a list of identifications of serving uplink access network devices, or a list of identifications of serving downlink access network devices.

In some example embodiments, the access response containing one or more scheduled uplink resources for a connection setup request, and the apparatus is further caused to: transmit to a second set of uplink access network device, a connection setup request on the one or more scheduled uplink resources; and receive a connection setup response from a second set of downlink access network devices.

In some example embodiments, the connection setup response contains at least one of a list of identifications of serving uplink access network devices, or a list of identifications of serving downlink access network devices.

In some example embodiments, the first set of uplink access network devices comprises a plurality of uplink access network devices, and the apparatus is caused to transmit the access request by: consecutively transmitting, by the terminal device, the access request to respective uplink access network devices of the plurality of uplink access network devices.

In some example embodiments, the apparatus is caused to receive the access response by: consecutively detecting, by the terminal device, a plurality of versions of the access response from the first set of downlink access network devices; and performing combining on the plurality of versions of the access response.

In some example embodiments, the identifications of the candidate downlink access network devices are ordered based on received powers of signals from the candidate downlink access network devices.

In some aspects, an apparatus implemented at a central network device comprises: at least one processor; and at least one memory including computer program code; the at least one memory and the computer program code configured to, with the at least one processor, cause the apparatus to: receive, via a third set of uplink access network devices from a terminal device, an access request containing a list of identifications of candidate downlink access network devices; and transmit an access response via a first set of downlink access network devices towards the terminal device.

In some example embodiments, the access request further contains an access resource indication.

In some example embodiments, the access response contains one or more scheduled resources for a connection setup request of the terminal device, and the apparatus is further caused to: receive connection setup request via a fourth set of uplink access network devices from the terminal device; and transmit a connection setup response via a second set of downlink access network devices towards the terminal device.

In some example embodiments, the access response contains a list of identifications of serving uplink access network devices, and the apparatus is further caused to: receive, from the third set of uplink access network devices, a set of received power indications of the access request; and determine, at least in part based on the set of received power indications, one or more uplink access network devices from the third set of uplink access network devices as one or more serving uplink access network devices for the terminal device.

In some example embodiments, wherein the fourth set of uplink access network devices is selected from the one or more serving uplink access network devices.

In some example embodiments, the connection setup response contains a list of identifications of serving uplink access network devices, and the apparatus is further caused to: receive, from the fourth set of uplink access network devices, a set of received power indications of the connection setup request; and determine, based on the set of received power indications, one or more uplink access network devices from the fourth set of uplink access network devices as one or more serving uplink access network devices for the terminal device.

In some example embodiments, the apparatus is further caused to: transmit an instruction to a fifth set of uplink access network devices to report a received power indication of the connection setup request, the fifth set of uplink access network devices including at least the fourth set of uplink access network devices.

In some example embodiments, the third set of uplink access network devices comprises a plurality of uplink access network devices in an access cluster, and the apparatus is further caused to: allocate an access related resource to uplink access network devices in the access cluster.

In some example embodiments, the apparatus is further caused to: determine one or more serving downlink access network devices based on the list of identifications of candidate downlink access network devices, wherein the access response or the connection setup response contains a list of identifications of the determined one or more serving downlink access network devices.

In some example embodiments, the second set of downlink access network devices is selected from the determined one or more serving downlink access network devices.

In some example embodiments, the identifications of the candidate downlink access network devices are ordered based on received power of signals from the candidate downlink access network devices.

In some example embodiments, the access request further comprises an access resource indication, and the apparatus is further caused to: identify, based on at least one of the access resource indication, the list of identifications of candidate downlink access network devices or the order of the identifications of the candidate downlink access network devices, that the access request is transmitted by the terminal device.

In some aspects, an apparatus implemented at a first uplink access network device, comprising: at least one processor; and at least one memory including computer program code; the at least one memory and the computer program code configured to, with the at least one processor, cause the apparatus to: receive an access request from a terminal device, the access request containing a list of identifications of candidate downlink access network devices; and forward the access request to a central network device.

In some example embodiments, the identifications of the candidate downlink access network devices are ordered based on received powers of signals from the candidate downlink access network devices.

In some example embodiments, the apparatus is further caused to: send a received power indication of the access request to the central network device.

In some aspects, an apparatus implemented at a second uplink access network device comprises: at least one processor; and at least one memory including computer program code; the at least one memory and the computer program code configured to, with the at least one processor, cause the apparatus to: receive, by a second uplink access network device, a connection setup request from a terminal device; forward the connection setup request to a central network device; and transmit a received power indication of the connection setup request to the central network device.

In some example embodiments, the apparatus is caused to receive the connection setup request from the terminal device by: in response to receiving an instruction from the central network device to receive the connection setup request, receiving the connection setup request from the terminal device.

In some example embodiments, the apparatus is caused to transmit the received power indication of the connection setup request to the central network device by: in response to receiving an instruction from the central network device to report the received power indication of the connection setup request, transmitting the received power indication of the connection setup request to the central network device.

In some aspects, an apparatus comprises: means for transmitting, by a terminal device, to a first set of uplink access network devices, an access request containing a list of identifications of candidate downlink access network devices; and means for receiving, by the terminal device, an access response from a first set of downlink access network devices.

In some example embodiments, the access request further contains an access resource indication.

In some example embodiments, the access response contains at least one of a list of identifications of serving uplink access network devices, or a list of identifications of serving downlink access network devices.

In some example embodiments, wherein the access response contains one or more scheduled uplink resources for a connection setup request, and the apparatus further comprises: means for transmitting, by the terminal device, to a second set of uplink access network device, a connection setup request on the one or more scheduled uplink resources; and means for receiving, by the terminal device, a connection setup response from a second set of downlink access network devices.

In some example embodiments, the connection setup response contains at least one of a list of identifications of serving uplink access network devices, or a list of identifications of serving downlink access network devices.

In some example embodiments, the first set of uplink access network devices comprises a plurality of uplink access network devices, and the means for transmitting the access request comprises: means for consecutively transmitting, by the terminal device, the access request to respective uplink access network devices of the plurality of uplink access network devices.

In some example embodiments, the means for receiving the access response comprises: means for consecutively detecting, by the terminal device, a plurality of versions of the access response from the first set of downlink access network devices; and means for performing combining on the plurality of versions of the access response.

In some example embodiments, the identifications of the candidate downlink access network devices are ordered based on received powers of signals from the candidate downlink access network devices.

In some aspects, an apparatus comprises: means for receiving, by a central network device via a third set of uplink access network devices from a terminal device, an access request containing a list of identifications of candidate downlink access network devices; and means for transmitting, by the central network device, an access response via a first set of downlink access network devices towards the terminal device.

In some example embodiments, the access request further contains an access resource indication.

In some example embodiments, the access response contains one or more scheduled resources for a connection setup request of the terminal device, and the apparatus further comprises: means for receiving, by the central network device, a connection setup request via a fourth set of uplink access network devices from the terminal device; and means for transmitting, by the central network device, a connection setup response via a second set of downlink access network devices towards the terminal device.

In some example embodiments, the access response contains a list of identifications of serving uplink access network devices, and the apparatus further comprises: means for receiving, from the third set of uplink access network devices, a set of received power indications of the access request; and means for determining, at least in part based on the set of received power indications, one or more uplink access network devices from the third set of uplink access network devices as one or more serving uplink access network devices for the terminal device.

In some example embodiments, the fourth set of uplink access network devices is selected from the one or more serving uplink access network devices.

In some example embodiments, the connection setup response contains a list of identifications of serving uplink access network devices, and the apparatus further comprises: means for receiving, from the fourth set of uplink access network devices, a set of received power indications of the connection setup request; and means for determining, based on the set of received power indications, one or more uplink access network devices from the fourth set of uplink access network devices as one or more serving uplink access network devices for the terminal device.

In some example embodiments, the apparatus further comprises: means for transmitting an instruction to a fifth set of uplink access network devices to report a received power indication of the connection setup request, the fifth set of uplink access network devices including at least the fourth set of uplink access network devices.

In some example embodiments, the third set of uplink access network devices comprises a plurality of uplink access network devices in an access cluster, and the apparatus further comprises: means for allocating an access related resource to uplink access network devices in the access cluster.

In some example embodiments, the apparatus further comprises: means for determining one or more serving downlink access network devices based on the list of identifications of candidate downlink access network devices. Further, the access response or the connection setup response contains a list of identifications of the determined one or more serving downlink access network devices.

In some example embodiments, the second set of downlink access network devices is selected from the determined one or more serving downlink access network devices.

In some example embodiments, the identifications of the candidate downlink access network devices are ordered based on received power of signals from the candidate downlink access network devices.

In some example embodiments, the access request further comprises an access resource indication, and the apparatus further comprises: means for identifying, based on at least one of the access resource indication, the list of identifications of candidate downlink access network devices or the order of the identifications of the candidate downlink access network devices, that the access request is transmitted by the terminal device.

In some aspects, an apparatus comprises: means for receiving, by a first uplink access network device, an access request from a terminal device, the access request containing a list of identifications of candidate downlink access network devices; and means for forwarding, by the first uplink access network device, the access request to a central network device.

In some example embodiments, the identifications of the candidate downlink access network devices are ordered based on received powers of signals from the candidate downlink access network devices.

In some example embodiments, the apparatus further comprises: means for sending a received power indication of the access request to the central network device.

In some aspects, an apparatus comprises: means for receiving, by a second uplink access network device, a connection setup request from a terminal device; means for forwarding, by the second uplink access network device, the connection setup request to a central network device; and means for transmitting, by the second uplink access network device, a received power indication of the connection setup request to the central network device.

In some example embodiments, the means for receiving the connection setup request from the terminal device comprises: means for in response to receiving an instruction from the central network device to receive the connection setup request, receiving the connection setup request from the terminal device.

In some example embodiments, the means for transmitting the received power indication of the connection setup request to the central network device comprises: means for in response to receiving an instruction from the central network device to report the received power indication of the connection setup request, transmitting the received power indication of the connection setup request to the central network device.

In some aspects, a computer readable storage medium comprises program instructions stored thereon, the instructions, when executed by a processor of a device, causing the device to perform the method according to some example embodiments of the present disclosure.

We claim:

1. An apparatus implemented at a terminal device, comprising:

at least one processor; and at least one memory including computer program code;

the at least one memory and the computer program code configured to, with the at least one processor, cause the apparatus to:

transmit, to a first set of uplink access network devices, an access request containing a list of identifications of candidate downlink access network devices; and receive an access response from a first set of downlink access network devices, wherein the first set of uplink access network devices comprises a plurality of uplink access network devices, and the apparatus is caused to transmit the access request by:

consecutively transmitting the access request to respective uplink access network devices of the plurality of uplink access network devices, wherein the apparatus is caused to receive the access response by:

consecutively detecting a plurality of versions of the access responses from the first set of downlink access network devices; and performing combining on the plurality of versions of the access responses.

2. The apparatus of claim 1, wherein the access request further contains an access resource indication.

3. The apparatus of claim 1, wherein the access response contains at least one of a list of identifications of serving uplink access network devices, or a list of identifications of serving downlink access network devices.

4. The apparatus of claim 1, wherein the access response contains one or more scheduled uplink resources for a connection setup request, and the apparatus is further caused to:

transmit, to a second set of uplink access network devices, a connection setup request on the one or more scheduled uplink resources;

receive a connection setup response from a second set of downlink access network devices; and wherein the connection setup response contains at least one of a list of identifications of serving uplink access network devices, or a list of identifications of serving downlink access network devices.

5. The apparatus of claim 1, wherein the identifications of the candidate downlink access network devices are ordered based on received powers of signals from the candidate downlink access network devices.

6. An apparatus implemented at a central network device, comprising:

at least one processor; and at least one memory including computer program code;

the at least one memory and the computer program code configured to, with the at least one processor, cause the apparatus to:

receive, via a third set of uplink access network devices from a terminal device, an access request containing a list of identifications of candidate downlink access network devices; and transmit an access response via a first set of downlink access network devices towards the terminal device, wherein the access response contains one or more scheduled resources for a connection setup request of the terminal device, and the apparatus is further caused to:

receive the connection setup request via a fourth set of uplink access network devices from the terminal device; and transmit a connection setup response via a second set of downlink access network devices towards the terminal device, wherein the access response contains a list of identifications of serving uplink access network devices, and the apparatus is further caused to:

receive, from the third set of uplink access network devices, a set of received power indications of the access request; and determine, at least in part based on the set of received power indications, one or more uplink access network devices from the third set of uplink access network devices as one or more serving uplink access network devices for the terminal device;

wherein the fourth set of uplink access network devices is selected from the one or more serving uplink access network devices.

7. The apparatus of claim 6, wherein the access request further contains an access resource indication.

8. The apparatus of claim 6, wherein the connection setup response contains a list of identifications of serving uplink access network devices, and the apparatus is further caused to:

receive, from the fourth set of uplink access network devices, a set of received power indications of the connection setup request; and determine, based on the set of received power indications, one or more uplink access network devices from the fourth set of uplink access network devices as one or more serving uplink access network devices for the terminal device.

9. The apparatus of claim 8, wherein the apparatus is further caused to:

transmit an instruction to a fifth set of uplink access network devices to report a received power indication of the connection setup request, the fifth set of uplink access network devices including at least the fourth set of uplink access network devices.

10. The apparatus of claim 6, wherein the third set of uplink access network devices comprises a plurality of uplink access network devices in an access cluster, and the apparatus is further caused to:

allocate an access related resource to the plurality of the uplink access network devices in the access cluster.

11. The apparatus of claim 6, wherein the apparatus is further caused to:

determine one or more serving downlink access network devices based on the list of identifications of candidate downlink access network devices;

wherein the access response or the connection setup response contains a list of identifications of the determined one or more serving downlink access network devices; and wherein the second set of downlink access network devices is selected from the determined one or more serving downlink access network devices.

12. The apparatus of claim 6, wherein the identifications of the candidate downlink access network devices are ordered based on received power of signals from the candidate downlink access network devices.

13. The apparatus of claim 12, wherein the access request further comprises an access resource indication, and the apparatus is further caused to:

identify, based on at least one of the access resource indication, the list of identifications of candidate downlink access network devices or the order of the identifications of the candidate downlink access network devices, that the access request is transmitted by the terminal device.

* * * * *